United States Patent

Graig

[15] 3,685,912
[45] Aug. 22, 1972

[54] LARGE AREA RETRO-TRANSMITTING LIGHT METER

[72] Inventor: Dwin R. Graig, Gaithersburg, Md.

[73] Assignee: Ingenuics, Inc., Gaithersburg, Md.

[22] Filed: April 1, 1970

[21] Appl. No.: 24,638

[52] U.S. Cl. ............356/157, 356/201, 356/209
[51] Int. Cl. ..................G01b 11/28, G01n 21/22
[58] Field of Search......356/120, 157, 200, 209–212, 356/201, 218, 233, 238, 239

[56] References Cited

UNITED STATES PATENTS

| | | | |
|---|---|---|---|
| 3,338,130 | 8/1967 | Gafford | 356/200 |
| 3,474,254 | 10/1969 | Piepenbrink et al. | 356/238 X |
| 2,471,750 | 5/1949 | Hunter | 356/210 |
| 3,013,467 | 12/1961 | Minsky | 250/215 X |
| 3,214,596 | 10/1965 | Schwerdt et al. | 350/276 R |

FOREIGN PATENTS OR APPLICATIONS

| | | | |
|---|---|---|---|
| 931,700 | 11/1947 | France | 356/157 |

Primary Examiner—Ronald L. Wibert
Assistant Examiner—F. L. Evans
Attorney—Elton H. Brown, Jr.

[57] ABSTRACT

A light meter for measuring the light reflected from a large area. A point source of light is reflected onto a high gain beaded reflective sheeting screen having the property of reflecting most of the light directly back to the source of the light. A reflecting mirror for the light is of the type that passes substantially half of the light and reflects substantially half of the light and is arranged at an angle so that part of the returning light from the reflecting screen will pass through the mirror to a photo electric cell positioned to correspond to the position of the light. The partially opaque object is laid on the reflective screen and the remaining portion of the reflecting screen is covered with a mask. The light is adjustable in intensity and is adjusted so that the photocell meter reads one hundred after the mask is in position but before the object is placed thereon. The reading after the object is placed thereon will give a percentage of clear area with respect to opaque area.

4 Claims, 6 Drawing Figures

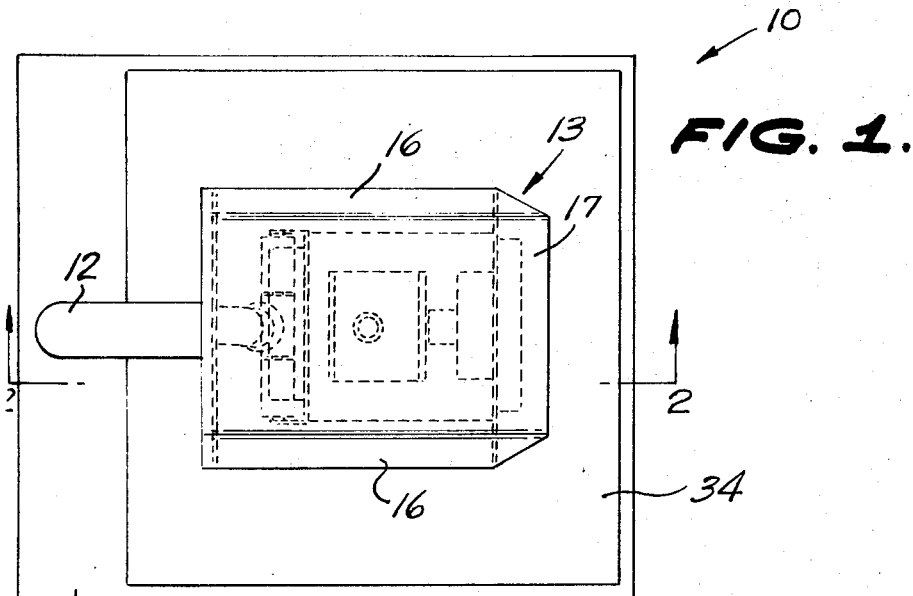
FIG. 1.
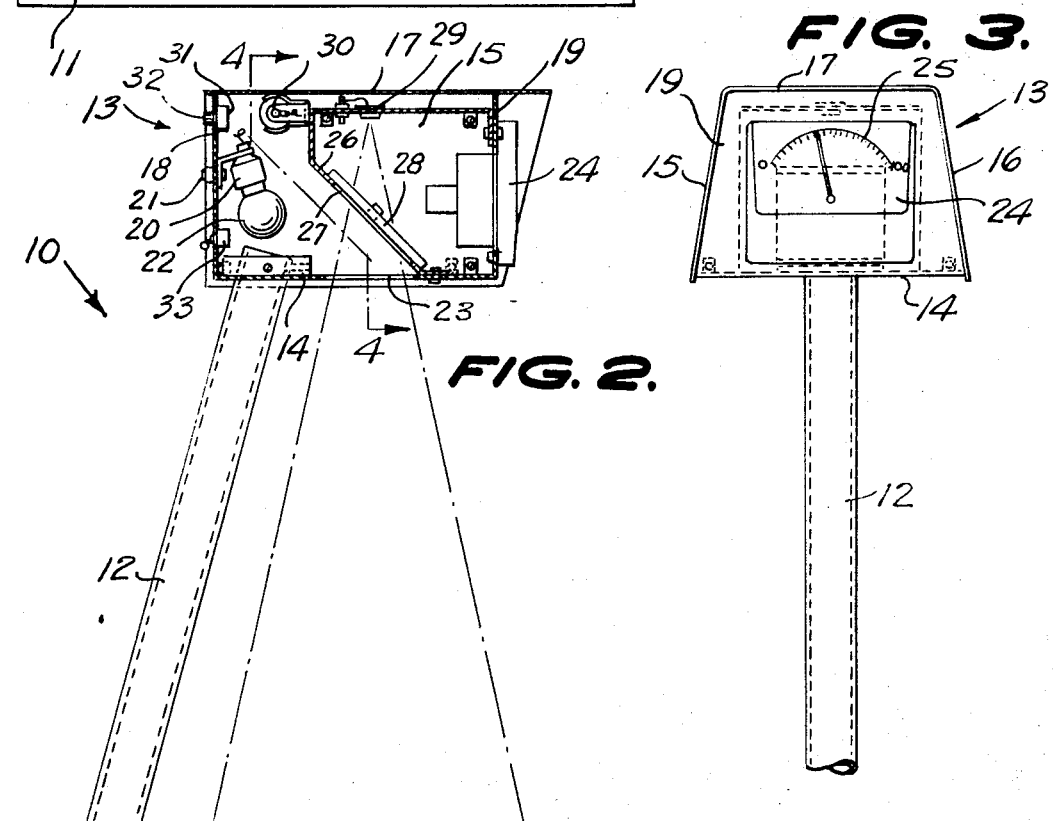
FIG. 2.
FIG. 3.
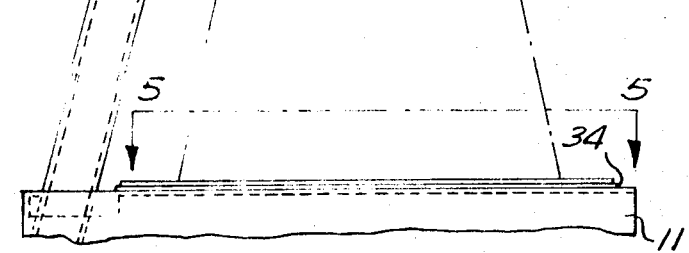
INVENTOR
DWIN R. CRAIG,
BY
Elton H. Brown, Jr.

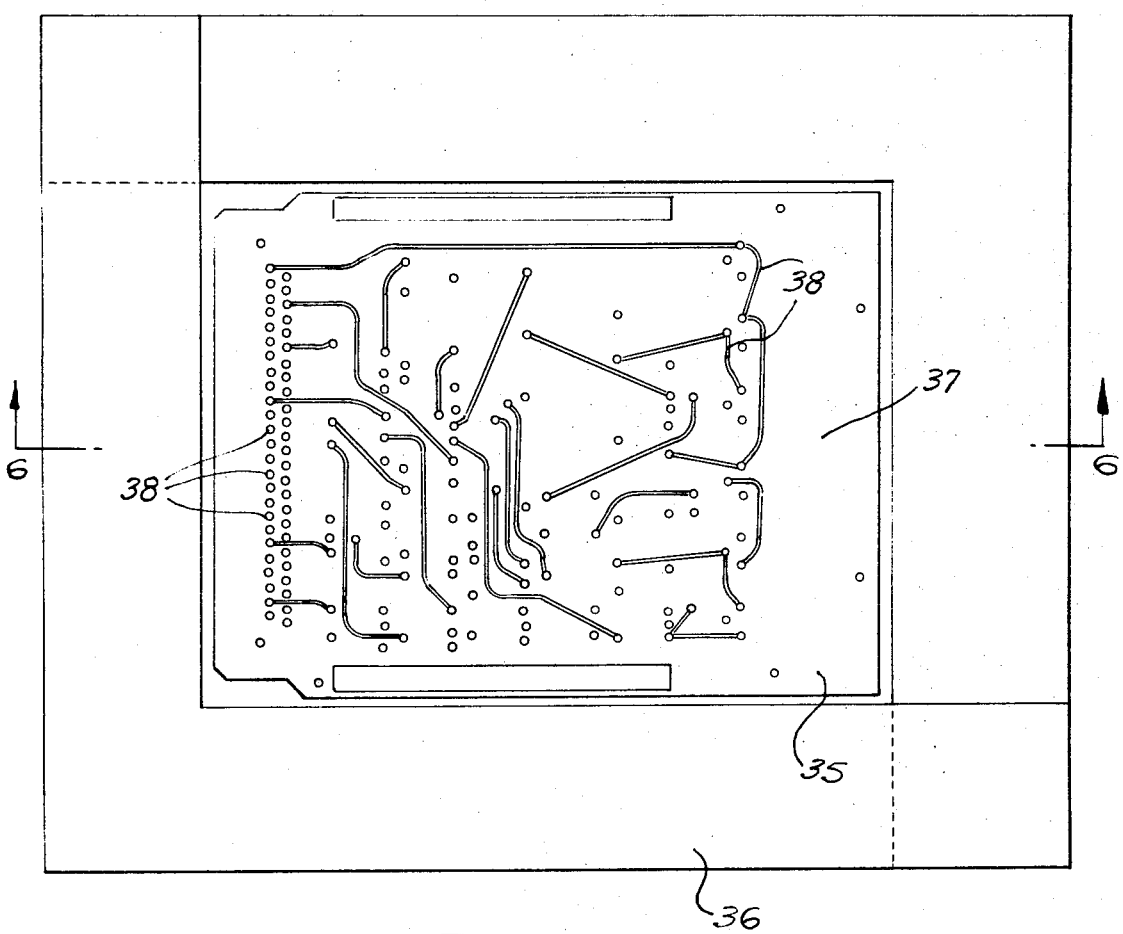
FIG. 5.
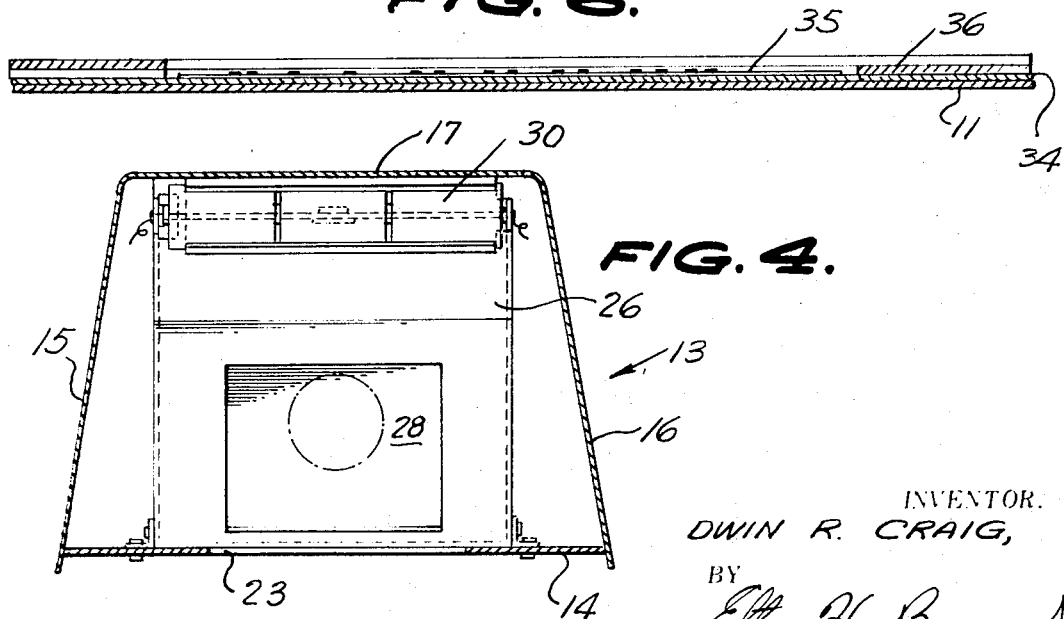
FIG. 6.
FIG. 4.
INVENTOR.
DWIN R. CRAIG,
BY
Elton H. Brown, Jr.

LARGE AREA RETRO-TRANSMITTING LIGHT METER

BACKGROUND OF THE INVENTION

1. Field of the Invention

The present invention relates to the measuring of clear area verses opaque area in objects.

2. Summary of the Invention

The present invention relates to a device for measuring the percentage of opaqueness of an object in which the amount of light passing through the object is measured by a photo electric cell and compared to the amount of light passed when the object is not present. A percentage of clear area with respect to opaque area is directly read on the photo cell dial.

The primary object of the invention is to provide a highly accurate device for directly reading the percentage of opaque area compared to the percentage of clear area of an object.

Other objects and advantages will become apparent in the following specification when considered in the light of the attached drawings.

BRIEF DESCRIPTION OF THE DRAWINGS

FIG. 1 is a top plan view of the invention;

FIG. 2 is a vertical sectional view, taken on the line 2—2 of FIG. 1, looking in the direction of the arrows;

FIG. 3 is a fragmentary front elevation of the invention;

FIG. 4 is an enlarged vertical sectional view, taken on the line 4—4 of FIG. 2, looking in the direction of the arrows;

FIG. 5 is a top plan view of the object and its mask; and

FIG. 6 is a vertical sectional view, taken on the line 6—6 of FIG. 5, looking in the direction of the arrows.

DESCRIPTION OF THE PREFERRED EMBODIMENT

Referring now to the drawings in detail wherein like reference characters indicate like parts throughout the several figures the reference numeral 10 indicates generally a large area retro-transmitting light meter constructed in accordance with the invention.

The meter 10 includes a generally rectangular base 11 have a post 12 extending upwardly from the rear edge thereof and sloping inwardly with respect thereto. A housing generally indicated at 13 includes a bottom wall 14 secured to the upper end of the post 12. Inwardly and upwardly sloping opposite side walls 15, 16 are secured to the bottom wall and have a generally rectangular top wall 17 integrally connecting their upper edges. A rear wall 18 extends integrally upwardly from the bottom wall 14 and is connected to the side walls 15, 16 and the top wall 17. A front wall 19 extends integrally upwardly from the forward edge of the bottom wall 14 and is connected to the side walls 15, 16 and the top wall 17.

The light socket 20 is secured to the rear wall 18 by means of a bolt 21 and a light bulb 22 is mounted in the socket 20. The light bulb 22 is incandescent and has a clear glass envelope with a small filament so as to approximate a point source of light.

The bottom wall 14 has an aperture 23 formed therein centrally positioned over the base 11. The front wall 19 has a meter 24 mounted therein having a dial 25 on its base calibrated from 0 to 100.

A light tight frame 26 is positioned in the housing 13. The frame 26 has an aperture 27 formed therein and positioned to overlie the aperture 23.

A mirror 28 is secured to the frame 26 in aligned relation with the aperture 27, with the mirror 28 arranged at substantially 45° to the bottom wall 14 of the housing 13. The mirror 28 is of the type generally referred to as a semi-mirror in which approximately 50 percent of the light is reflected and approximately 50 percent of the light is transmitted.

A photocell 29 is secured to the frame 26 in a position overlying the aperature 28 and the aperture 23 centrally of the base 11. A battery unit 30 for the photocell 29 and the meter 24 is mounted on the frame 26 within the housing 13.

A rheostat control 31 is mounted on the rear wall 18 and is provided with a hand controlled knob 32 for varying the voltage to and the brilliance of the incandescent bulb 22. An off on switch 33 controlling power to the bulb 22 is also mounted on the rear wall 18.

The light bulb 22, mirror 28 and photocell 29 are positioned so that the distance from the filament of the light bulb 22 to the mirror 28 is identical to the distance from the photocell 29 to the mirror 28.

A generally rectangular reflective screen 34 is supported on the base 11 parallel thereto. The reflective screen 34 is a high gain beaded reflective sheeting having the property of reflecting most of the light directly back to the source of the light. A screen having this property is formed of "Scotchlite" brand high gain retro-control sheeting No. 7610 manufactured by the 3 M Company, St Paul Minnesota. U.S. Pat. No. 2,326,634 issued Aug. 10, 1943 to Gebhard et. al, illustrates one method of making the screen.

An object 35 is positioned centrally on the screen 34 and is surrounded by an adjustable mask 36 the object 35 is in this case a sheet of film used for forming printed circuits and has opaque portions 37 and clear portions 38.

In the use and operation of the invention the object 35 is positioned centrally on the screen 34 and the adjustable mask 36 is fitted thereto. The object 35 is then removed leaving the mask 36 in position on the screen 27. The light 22 is then energized so that that portion of the screen 34 is illuminated by the reflection of the light from the bulb 22 from the mirror 28. The light striking the screen 34 through the opening where the object 35 has been removed then passes on the same line that it reached the screen 34 striking the mirror 28 with half of the light passing upwardly through the mirror 28 to impinge on the photocell 29. The rheostat control 31 is then adjusted with the hand control knob 32 until the meter 24 reads 100 on the dial 25. The object 35 is then replaced on the screen 34 within the boundaries of the mask 36 and the light is again measured by the photocell 29 and indicated on the dial 25. The opaque portions 37 of the object 35, screen out light from passing therethrough and only those portions of the object 35 which are transparent, as at 38, permit the light to pass downwardly through the object 35 to reach the screen 34. As before light reaching the screen 34 is reflected on exactly the same line that it used in arriving at the screen 34 so it passes back upwardly through the transparent portions 38 of the object 35 through the mirror 28 to impinge on the photocell 29. In the situation where one half of the object 28 is opaque and one half transparent the meter 24 will register 50 under the conditions described above. It should be noted that the sensitivity of the meter 24 is doubled by passing the light twice through the object 35 prior to reaching the photocell 29.

One of the uses of the present invention is to accurately measure the area to be plated in order to determine the quantity of metal required in plating a printed circuit.

Ambient light falling on the screen 34 will reflect back to the source of the ambient light along the same line used to reach the screen 34 and hence the ambient light will not affect the reading on the photocell 29. In view of the fact that ambient light does not affect the accuracy of the meter 10, it is obvious that the meter 10, may be used in a normally illuminated room.

The positions of the light 22 and photocell 29 may be interchanged without altering the function of the meter 10 and the specification and claims are thus defined.

Having thus described the preferred embodiment of the invention it should be understood that numerous structural modifications and adaptations may be resorted to without departing from the spirit of the invention.

What is claimed is:

1. A large area retro-transmitting light meter for instantaneously measuring the percent opaque area versus the percent transparent area of the total area of a sample, comprising a generally flat high gain beaded reflective sheeting screen for reflecting most of the light falling thereon directly back to the source of the light and for supporting a stationary sample not larger than said screen and having opaque and transparent areas, a light source approximating a point source of light positioned adjacent said screen, a mirror positioned to reflect rays from said light source through the transparent areas of the sample to said screen, said mirror reflecting a portion of the light and transmitting the remainder of the light falling thereon, a photocell positioned to receive light reflected from said screen back through the transparent areas of the sample, a meter to measure and indicate the total light reaching said photocell and hand controlled means for varying the intensity of the light source to calibrate said light meter.

2. A device as claimed in claim 1 wherein the distance between said light and said mirror and said photocell and said mirror is substantially equal.

3. A device as claimed in claim 1 wherein an adjustable mask is positioned on said screen to mask out a portion of the light reflected therefrom.

4. A device as claimed in claim 1 wherein said mirror reflects substantially 50 percent of the light falling thereon and transmits substantially 50 percent of the light falling thereon.

* * * * *